(12) United States Patent
Moore et al.

(10) Patent No.: US 12,447,478 B2
(45) Date of Patent: Oct. 21, 2025

(54) SAND TRAPS FOR USE IN OIL AND GAS EXTRACTION OPERATIONS

(71) Applicant: Ideal Completion Services LLC, Tulsa, OK (US)

(72) Inventors: Cody Steven Moore, Evanston, WY (US); Jeremy Myers, Calgary (CA)

(73) Assignee: Ideal Completion Services LLC, Tulsa, OK (US)

( * ) Notice: Subject to any disclaimer, the term of this patent is extended or adjusted under 35 U.S.C. 154(b) by 695 days.

(21) Appl. No.: 17/444,442

(22) Filed: Aug. 4, 2021

(65) Prior Publication Data
US 2022/0126306 A1  Apr. 28, 2022

Related U.S. Application Data

(60) Provisional application No. 63/106,768, filed on Oct. 28, 2020.

(51) Int. Cl.
| | |
|---|---|
| *B04C 5/13* | (2006.01) |
| *B04C 5/081* | (2006.01) |
| *B04C 5/14* | (2006.01) |
| *B04C 9/00* | (2006.01) |
| *E21B 43/34* | (2006.01) |

(52) U.S. Cl.
CPC ............... *B04C 5/13* (2013.01); *B04C 5/081* (2013.01); *B04C 5/14* (2013.01); *B04C 9/00* (2013.01); *E21B 43/35* (2020.05); *B04C 2009/002* (2013.01)

(58) Field of Classification Search
CPC .. B04C 5/13; B04C 5/081; B04C 5/14; B04C 9/00; B04C 2009/002; B04C 5/185; E21B 43/35
See application file for complete search history.

(56) References Cited

U.S. PATENT DOCUMENTS

| | | | |
|---|---|---|---|
| 4,140,632 A | | 2/1979 | Boivin |
| 5,544,011 A | * | 8/1996 | Blaney .................. G06F 1/1632 |
| | | | 361/679.58 |
| 10,439,323 B1 | * | 10/2019 | Higgins ................ H01R 13/502 |
| 10,717,026 B1 | | 7/2020 | Anderson et al. |
| 10,857,487 B2 | | 12/2020 | Marshall et al. |
| 2009/0316518 A1 | | 12/2009 | Goldsmith |
| 2012/0125601 A1 | * | 5/2012 | Mussig ................ B01D 46/406 |
| | | | 166/235 |
| 2014/0348619 A1 | * | 11/2014 | Granger ................ B65B 65/003 |
| | | | 414/809 |
| 2019/0262841 A1 | * | 8/2019 | Shu .......................... B04C 5/04 |
| 2020/0116004 A1 | | 4/2020 | Gamarra et al. |

FOREIGN PATENT DOCUMENTS

| | | | |
|---|---|---|---|
| CN | 201517055 U | 6/2010 | |
| WO | WO-2019180406 A1 | * 9/2019 | ............. B01D 21/00 |

OTHER PUBLICATIONS

Whitelock, D.P. et al—"Using Cyclones Effectively at Cotton Gins"—2009 (Year: 2009).
Yang et al—CN201517055U Machine Translation—2010 (Year: 2010).

* cited by examiner

*Primary Examiner* — Krishnan S Menon
*Assistant Examiner* — Tak L Chiu
(74) *Attorney, Agent, or Firm* — AVEK IP, LLC

(57) ABSTRACT

A sand trap for oil and gas extraction includes a cyclonic flow section having a longitudinal axis, an inlet for receiving a high-pressure fluid stream with particulates, an upper portion, a choke area, and a funnel portion narrowing from the upper portion to the choke area. The inlet has an axis generally perpendicular but askew to the longitudinal axis. A vortex finder extends downwardly from a cap and defines a passageway coaxial with the longitudinal axis for fluid to exit. A spherical accumulator extends downwardly from the cyclonic flow section and has a center axis coaxial with the longitudinal axis. Upper and lower ends of the spherical accumulator each have an opening centered along the longitudinal axis, and the spherical accumulator is unobstructed from the upper opening to the lower opening for the particulates to pass unimpeded and accumulate in the accumulator.

19 Claims, 12 Drawing Sheets

US 12,447,478 B2

SAND TRAPS FOR USE IN OIL AND GAS EXTRACTION OPERATIONS

RELATED APPLICATIONS

This application claims priority to U.S. Application No. 63/106,768, filed Oct. 28, 2020, which is incorporated by reference in its entirety herein.

FIELD OF THE DISCLOSURE

The disclosure relates generally to the field of oil and gas extraction. More particularly, the disclosure relates to sand traps, also commonly referred to as sand separators, which are commonly used in oil and gas extraction for removing sand and particulates from fluid streams to prevent erosive damage to piping, valves, and pumping equipment.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, a sand trap for use in oil and gas extraction operations has a hollow cylindrical wall, a cap, a vortex finder, a cyclonic insert, and a spherical accumulator. The hollow cylindrical wall has upper and lower ends and a longitudinal axis extending generally vertically, and the hollow cylindrical wall has an inlet opening for receiving a high pressure fluid stream with particulates. The inlet opening has an axis generally perpendicular but askew to the longitudinal axis of the hollow cylindrical wall. The cap is selectively secured over the hollow cylindrical wall. The vortex finder extends downwardly from the cap and defines a passageway for fluid to exit. The passageway is coaxial with the longitudinal axis of the hollow cylindrical wall. The cyclonic insert is inside the hollow cylindrical wall and has a generally cylindrical upper portion, a choke area, and a funnel portion that narrows from the upper portion to the choke area. The generally cylindrical upper portion has an inlet that is at least as big as the inlet opening and is configured to align with the inlet opening to allow uninterrupted flow into the cyclonic insert. The spherical accumulator extends downwardly from the hollow cylindrical wall and has upper and lower ends and a center axis that is coaxial with the longitudinal axis of the hollow cylindrical wall. The spherical accumulator upper end has an upper opening centered along the longitudinal axis of the hollow cylindrical wall, and the spherical accumulator lower end has an exit opening centered along the longitudinal axis of the hollow cylindrical wall. The spherical accumulator is unobstructed from the upper opening to the exit opening such that the particulates are allowed to pass unimpeded and accumulate in the accumulator.

According to another embodiment, a sand trap for use in oil and gas extraction operations includes a cyclonic flow section, a cap over the cyclonic flow section, a vortex finder, and a spherical accumulator. The cyclonic flow section has a longitudinal axis, an inlet opening for receiving a high pressure fluid stream with particulates, a generally cylindrical upper portion, a choke area, and a funnel portion that narrows from the upper portion to the choke area. The inlet opening has an axis generally perpendicular but askew to the longitudinal axis. The vortex finder extends downwardly from the cap and defines a passageway for fluid to exit. The passageway is coaxial with the longitudinal axis. The spherical accumulator extends downwardly from the cyclonic flow section and has upper and lower ends and a center axis that is coaxial with the longitudinal axis. The spherical accumulator upper end has an upper opening centered along the longitudinal axis, the spherical accumulator lower end has an exit opening centered along the longitudinal axis, and the spherical accumulator is unobstructed from the upper opening to the exit opening such that the particulates are allowed to pass unimpeded and accumulate in the accumulator.

DETAILED DESCRIPTION

Figure 1:
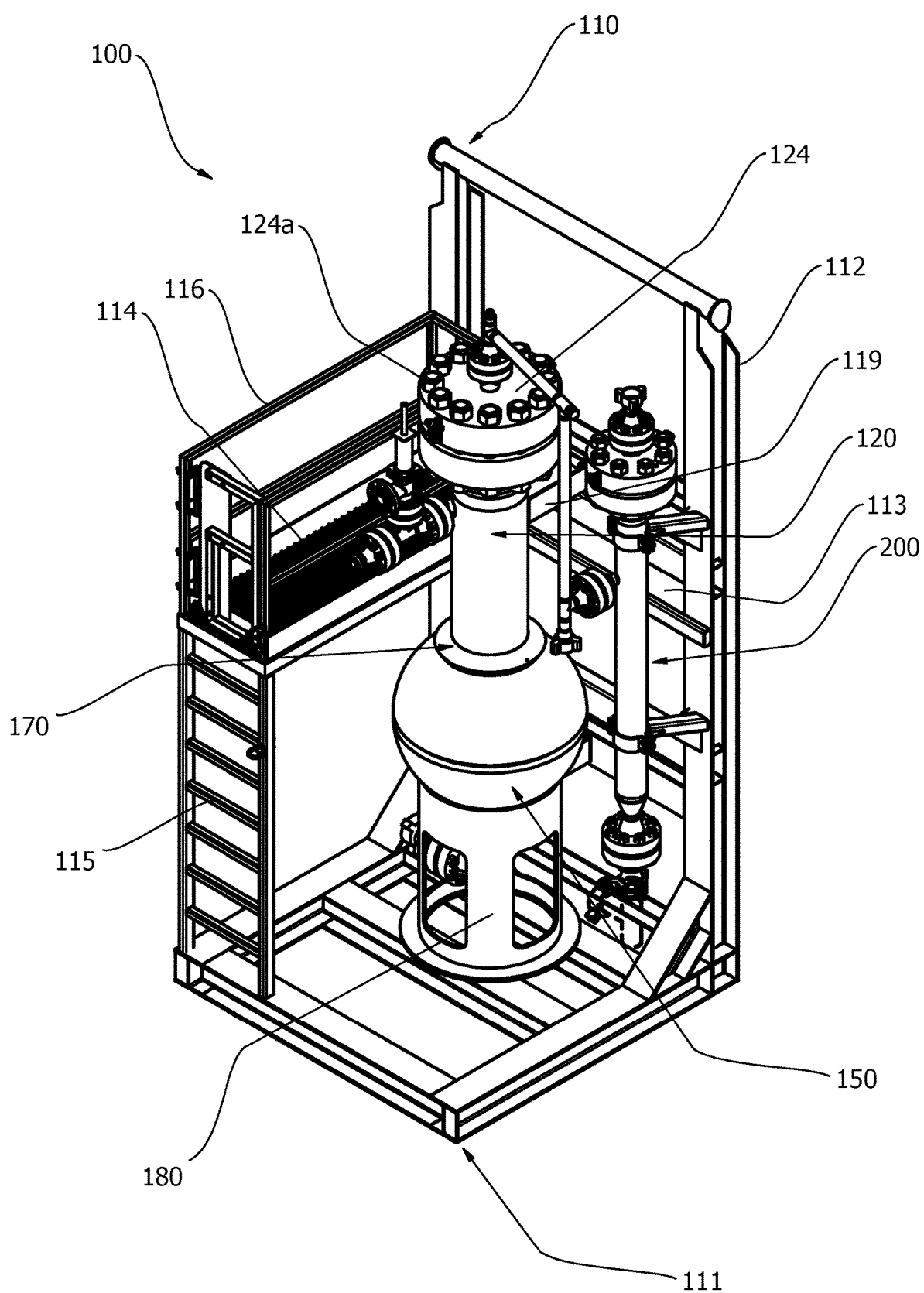
FIG. 1 is a perspective view showing a sand trap according to an embodiment of the current invention.
Figure 2:
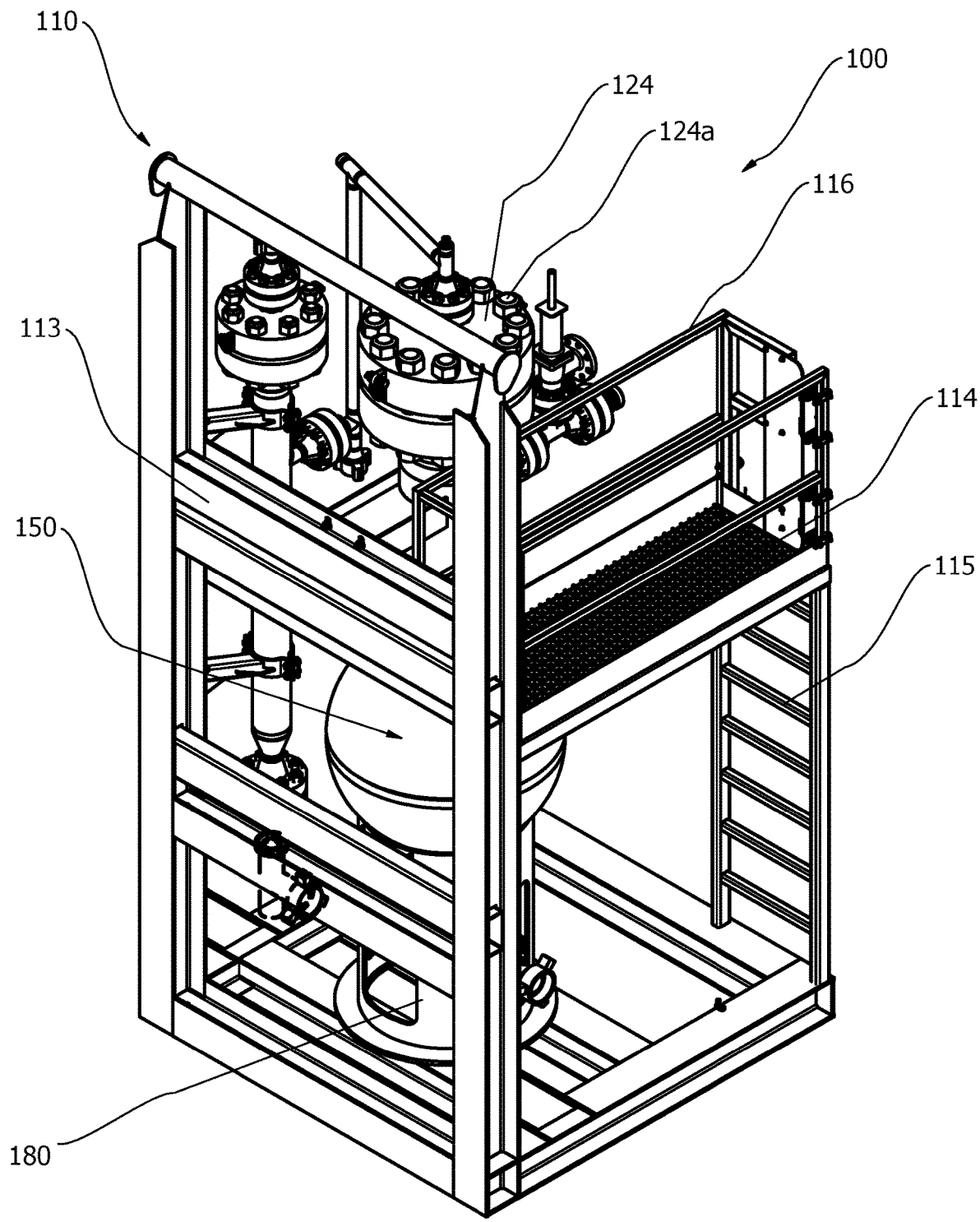
FIG. 2 is another perspective view showing the sand trap of FIG. 1.
Figure 3:
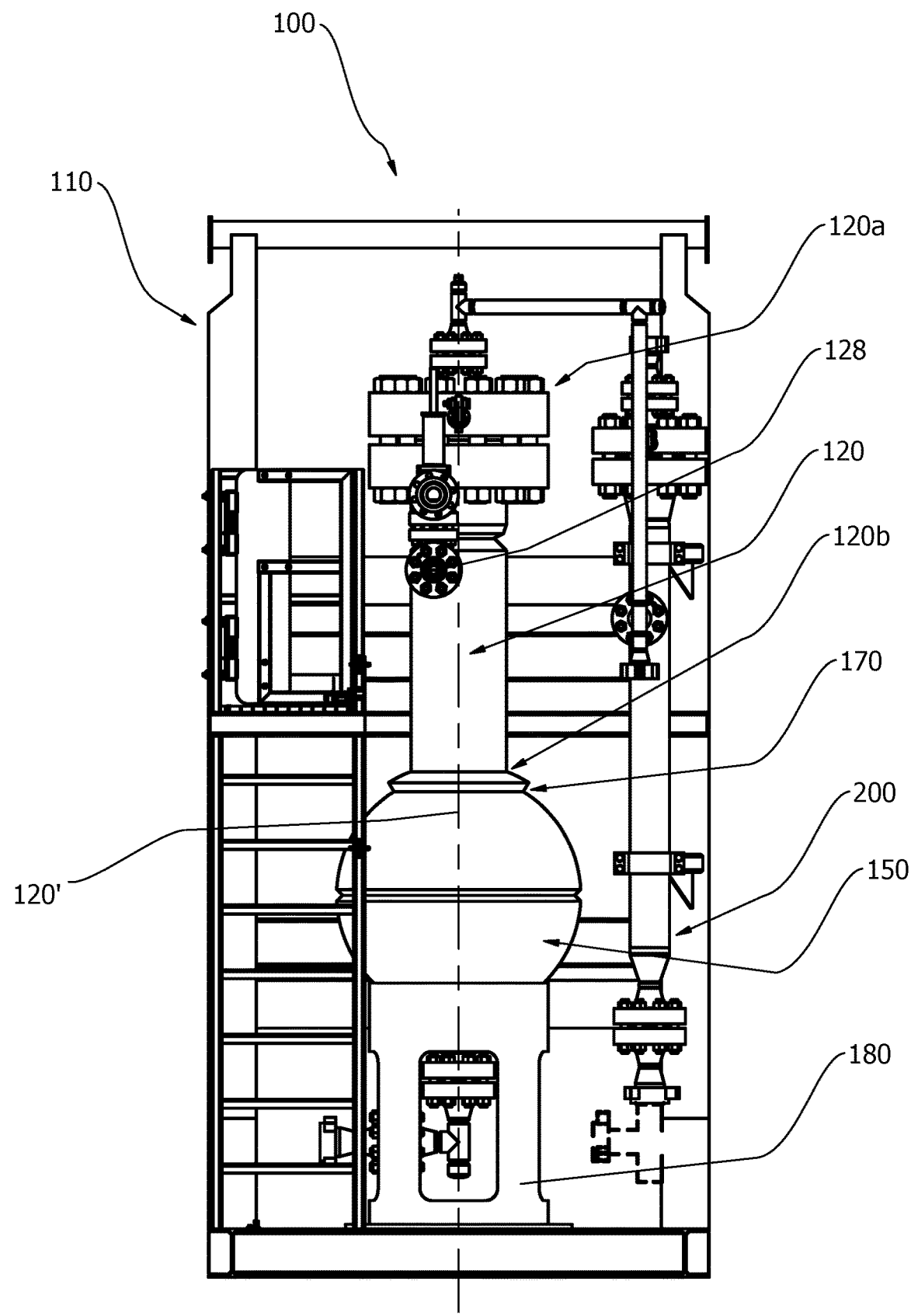
FIG. 3 is a front view of the sand trap of FIG. 1.
Figure 4:
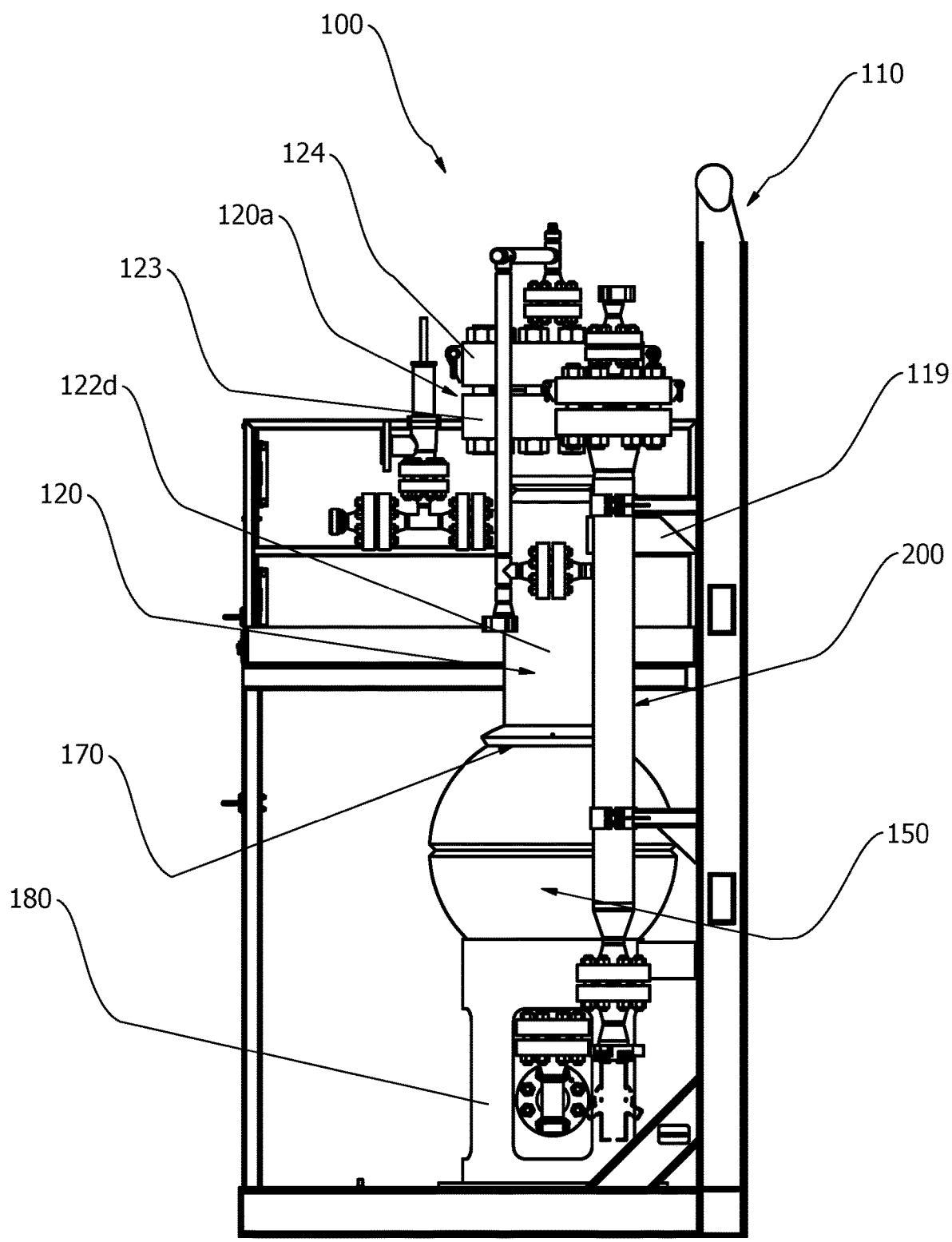
FIG. 4 is a side view of the sand trap of FIG. 1.
Figure 5:
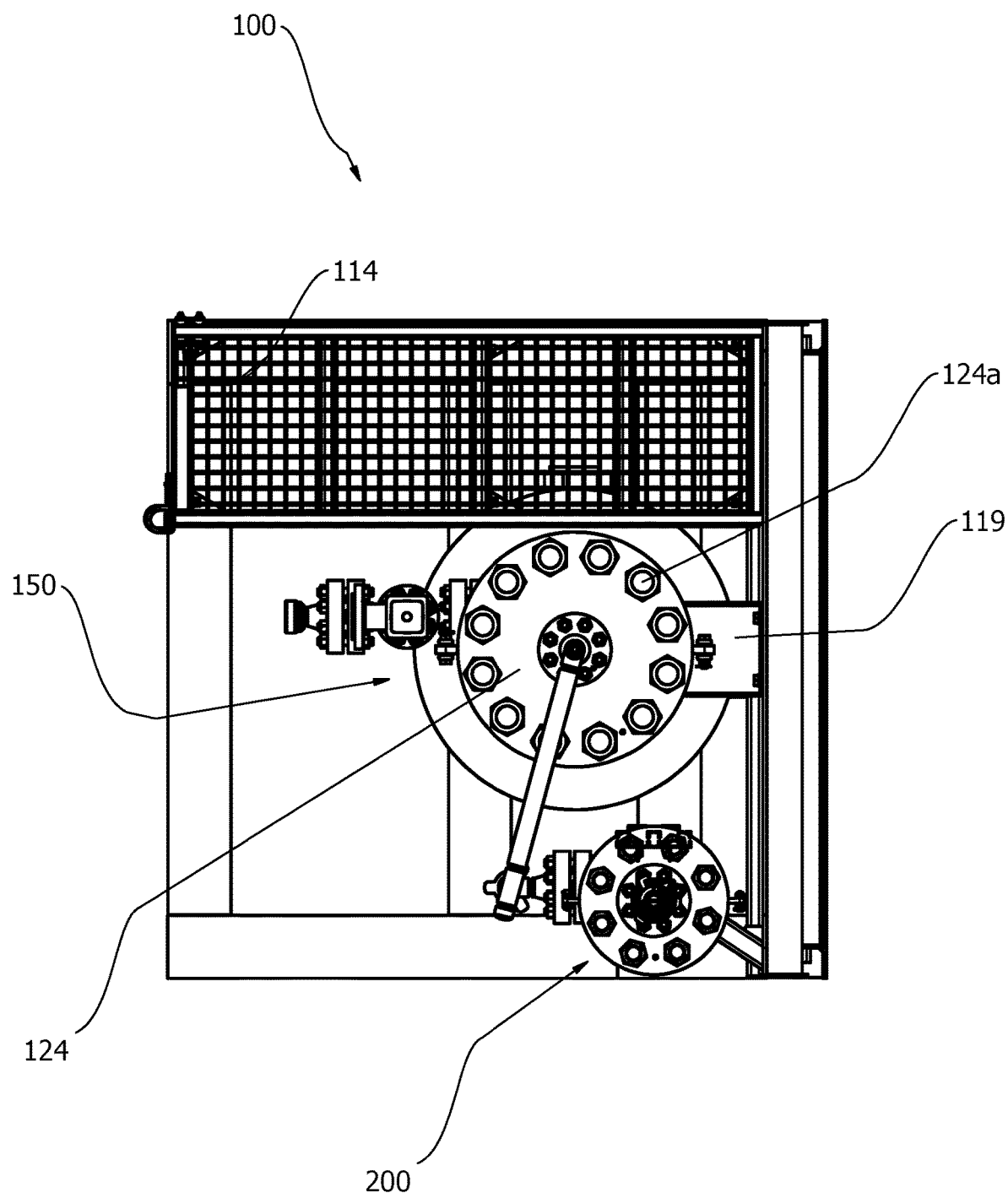
FIG. 5 is a top view of the sand trap of FIG. 1.
Figure 6:
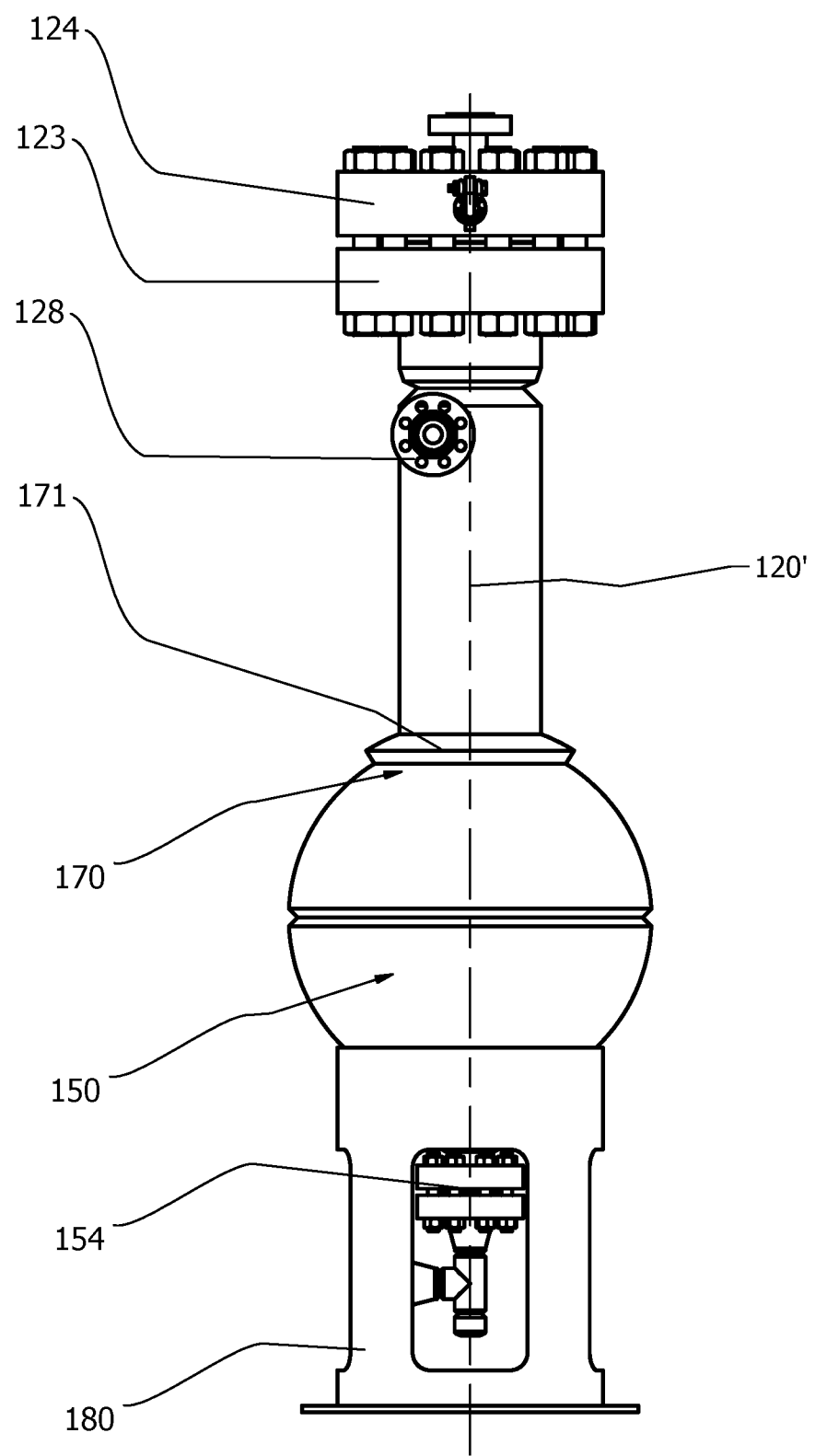
FIG. 6 is a front view of the sand trap of FIG. 1, shown without skid.
Figure 7:
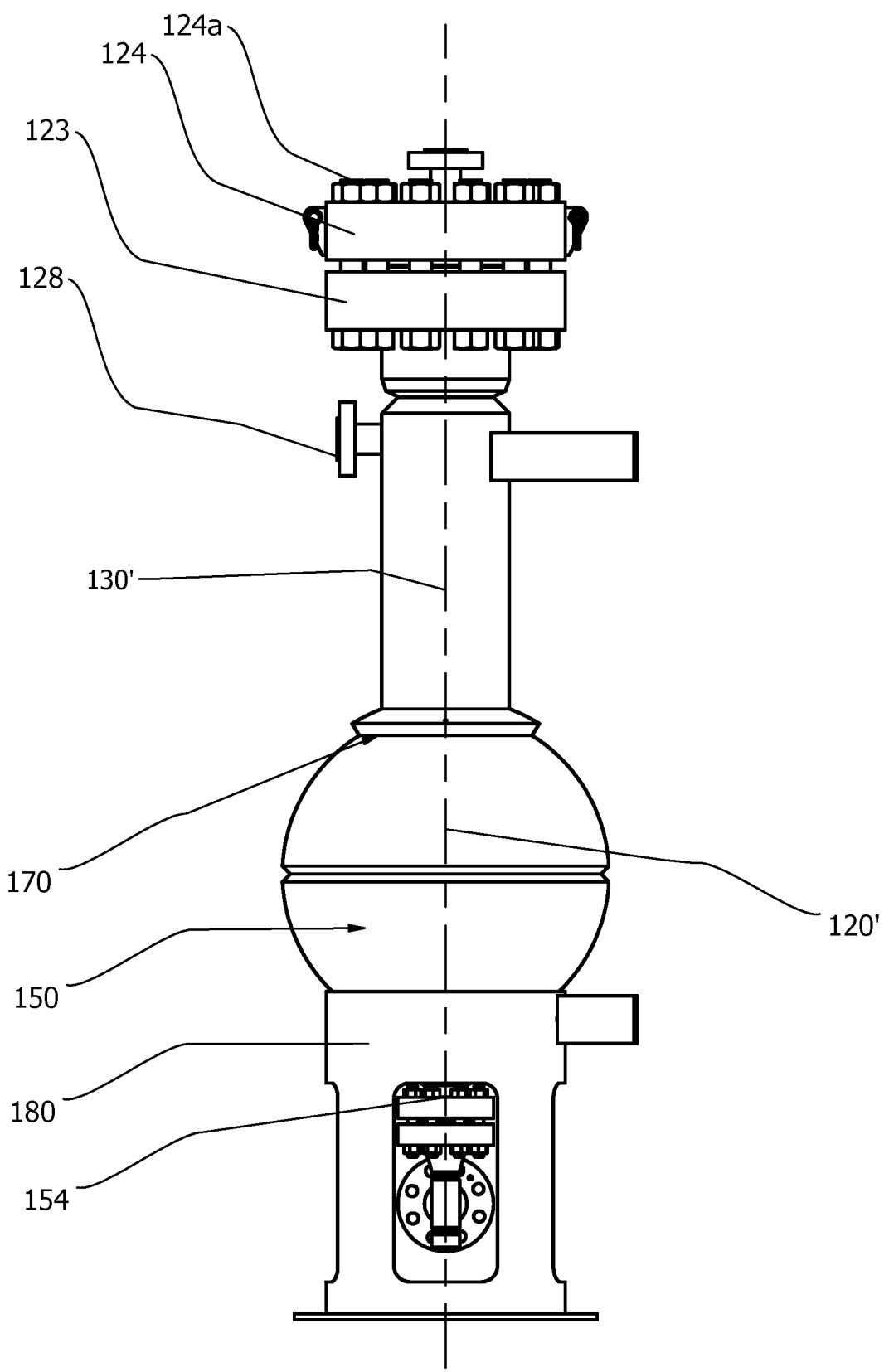
FIG. 7 is a side view of the sand trap of FIG. 1, shown without skid.
Figure 8:
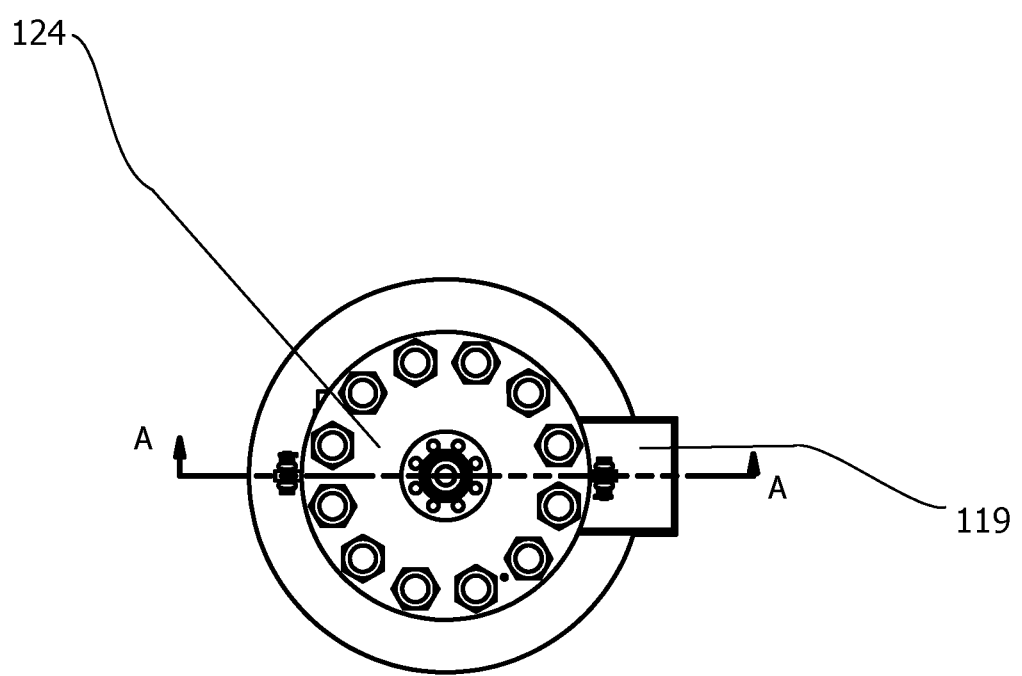
FIG. 8 is a top view of the sand trap of FIG. 1, shown without skid.

Fluid streams in oil and gas extraction operations are often under high pressure and carry significant amounts of solids, including sand and other particulates. The sand and particulates are erosive, and improved devices are needed to separate them from the fluid. FIGS. 1 through 10 illustrate a sand trap 100 according to an embodiment of the current invention. While FIGS. 1 through 10 illustrate one preferred embodiment drawn to scale, other embodiments have different geometries, including angles, proportions, lengths, et cetera apart from those in the figures. The sand trap 100 broadly includes a skid 110, a cylindrical shell 120 with a cyclonic insert 130, a solids accumulator 150, and a reinforcement pad 170.

The skid 110, shown in FIGS. 1 through 5, has a base 111, posts 112, joists 113 supported by the posts 112, decking 114, a ladder 115 providing access for a person to walk on the decking 114, and safety railing 116 to enclose at least part of an area over the decking 114. Bracing 119 extends from a post 112 or a joist 113 to support the cylindrical shell 120, and it may be particularly desirable for the bracing 119 to be located at a height substantially coinciding with a height of axis 126a (discussed below). The components of the skid 110 may be constructed of metal (e.g., steel) or any other appropriate material, and it may be particularly desirable for the skid 110 to be movable between a generally horizontal position for transport and a generally erect position for use.

Figure 9:
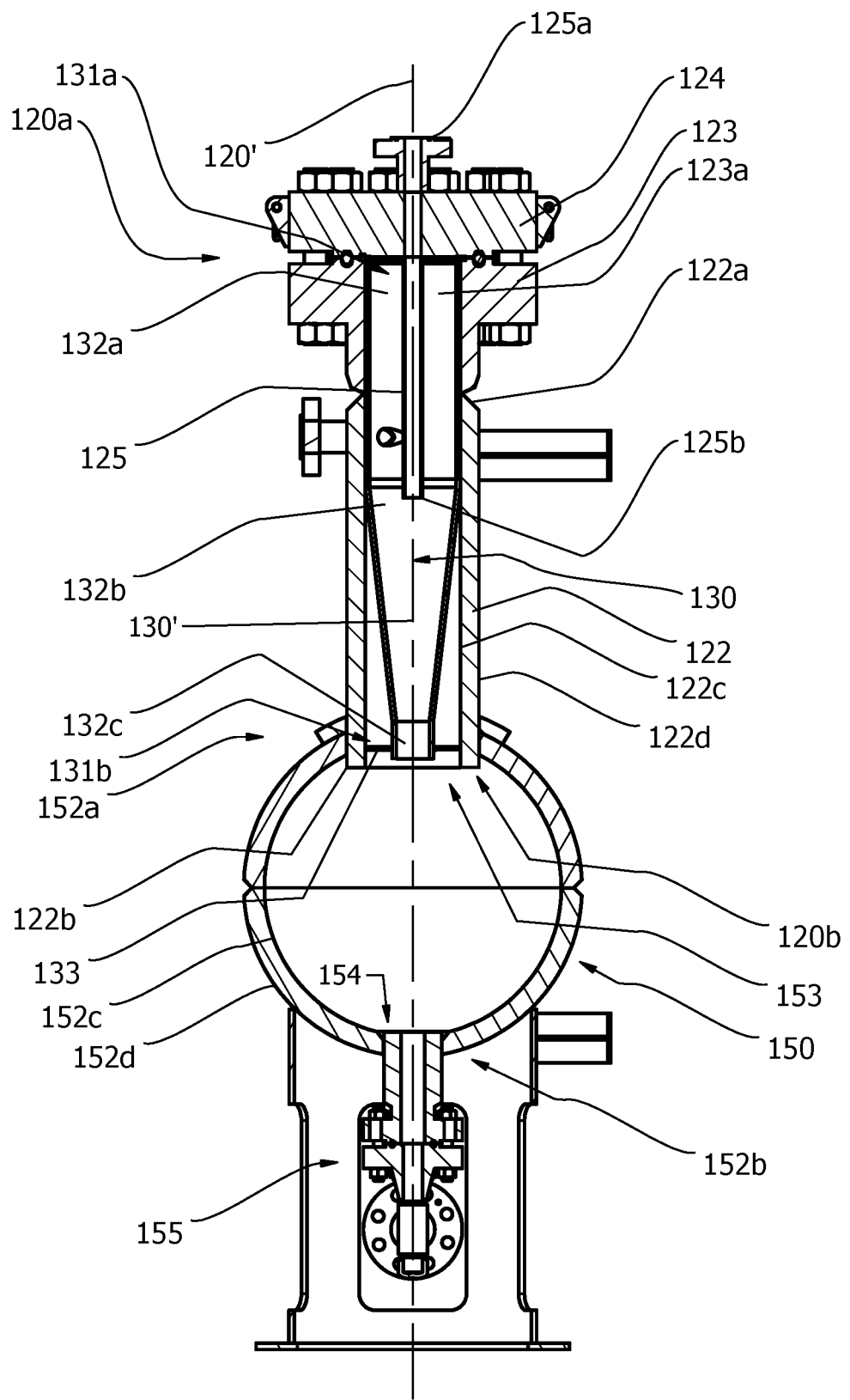
FIG. 9 is a section view taken along line A of FIG. 8.
Figure 10:
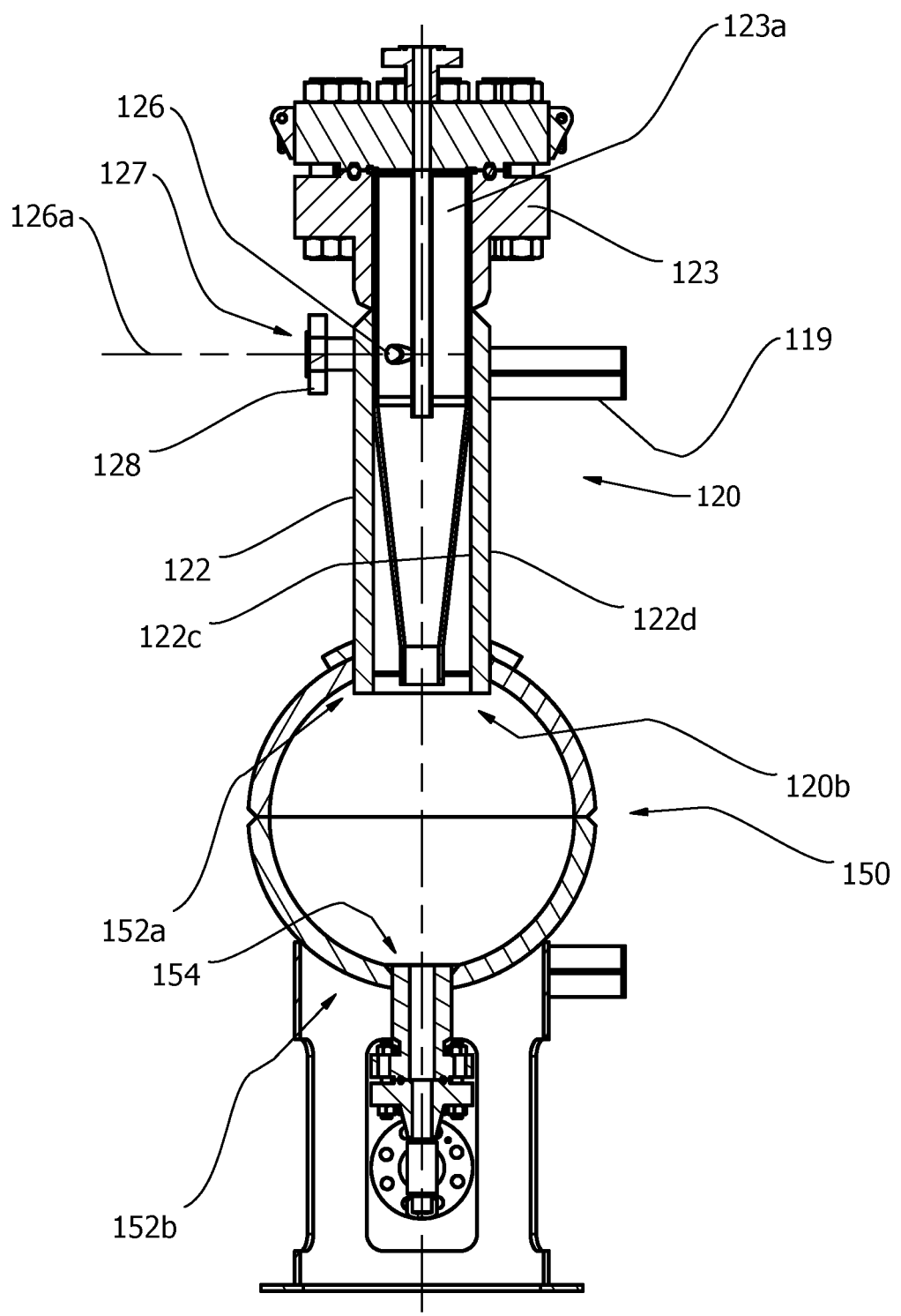
FIG. 10 is another section view similar to that of FIG. 9, but rotated ninety degrees and shown without cyclonic insert.

The cylindrical shell 120 is positioned above the accumulator 150 and has upper and lower ends 120a, 120b and a longitudinal axis 120' that extends generally vertically. As shown in FIGS. 9 and 10, the cylindrical shell 120 has a hollow cylindrical wall 122 with upper and lower ends 122a, 122b and inner and outer faces 122c, 122d. A flange 123 is coupled to the cylindrical wall upper end 122a in any appropriate manner, such as through welding, threading, et cetera. The flange 123 includes an opening 123a extending therethrough, and it may be desirable for the opening 123a to be generally aligned with the inner face 122c of the hollow cylindrical wall 122.

A flange (or "cap") 124 is configured to be removably secured atop the flange 123 (e.g., by bolts 124a or other appropriate fasteners), and a vortex finder 125 is coupled to the flange 124 such that the vortex finder 125 extends along the longitudinal axis 120' when the flange 124 is secured to the flange 123. The vortex finder 125 has open upper and lower ends 125a, 125b, with the open upper end 125a being configured for attachment to outlet piping. In some embodiments, the vortex finder 125 may be a single piece of pipe; in other embodiments, the vortex finder 125 may be formed of multiple pieces of piping and/or part of the cap 124. For example, the vortex finder 125 may be formed of a piece of pipe extending below the cap 124, a passageway in the cap 124, and another piece of pipe extending above the cap 124.

The cylindrical wall 122 has an inlet opening 126 (FIG. 10) with an axis 126a that is perpendicular but askew to the longitudinal axis 120'. The inlet opening 126 is tangential to the cylindrical wall 122, imparting a laminar circular motion to inlet flow as it enters the shell 120. An inlet 127 extends from the inlet opening 126 along the axis 126a and leads to an attachment flange 128 configured for attachment to inlet piping.

Focus is now directed to the cyclonic insert 130, shown in FIGS. 9 and 11 through 13. The cyclonic insert 130 is annular and has top and bottom ends 131a, 131b and a longitudinal axis 130' that is coaxial with the longitudinal axis 120'. In some embodiments, the cyclonic insert 130 may have a generally-consistent wall thickness. An upper portion 132a of the cyclonic insert 130 is generally cylindrical and leads to a funnel portion 132b that narrows to a choke area 132c. The vortex finder lower end 125b is located below the inlet opening 126, and it may be particularly desirable for the vortex finder lower end 125b to be located in the funnel portion 132b. An inlet 132d is defined in the upper portion 132a, and the inlet is at least as big as the inlet opening 126 and is configured to align with the inlet opening 126 to allow uninterrupted flow into the cyclonic insert 130.

It may be desirable for at least one support (or "stabilizer") 133 to extend from the choke area 132c to the inner face 122c of the cylindrical wall 122 to stabilize the choke area 132c when the sand trap 100 is in use. The support 133 may be annular, a rod, or any other suitable shape. In some embodiments, it may be particularly desirable for the support 133 to meet the inner face 122c of the cylindrical wall 122 where the outer face 122d of the cylindrical wall 122 meets the accumulator 150 (as shown in FIG. 9). If the support 133 is annular, the support 133 may act as a cap or ceiling to the accumulator 150.

Figure 11:
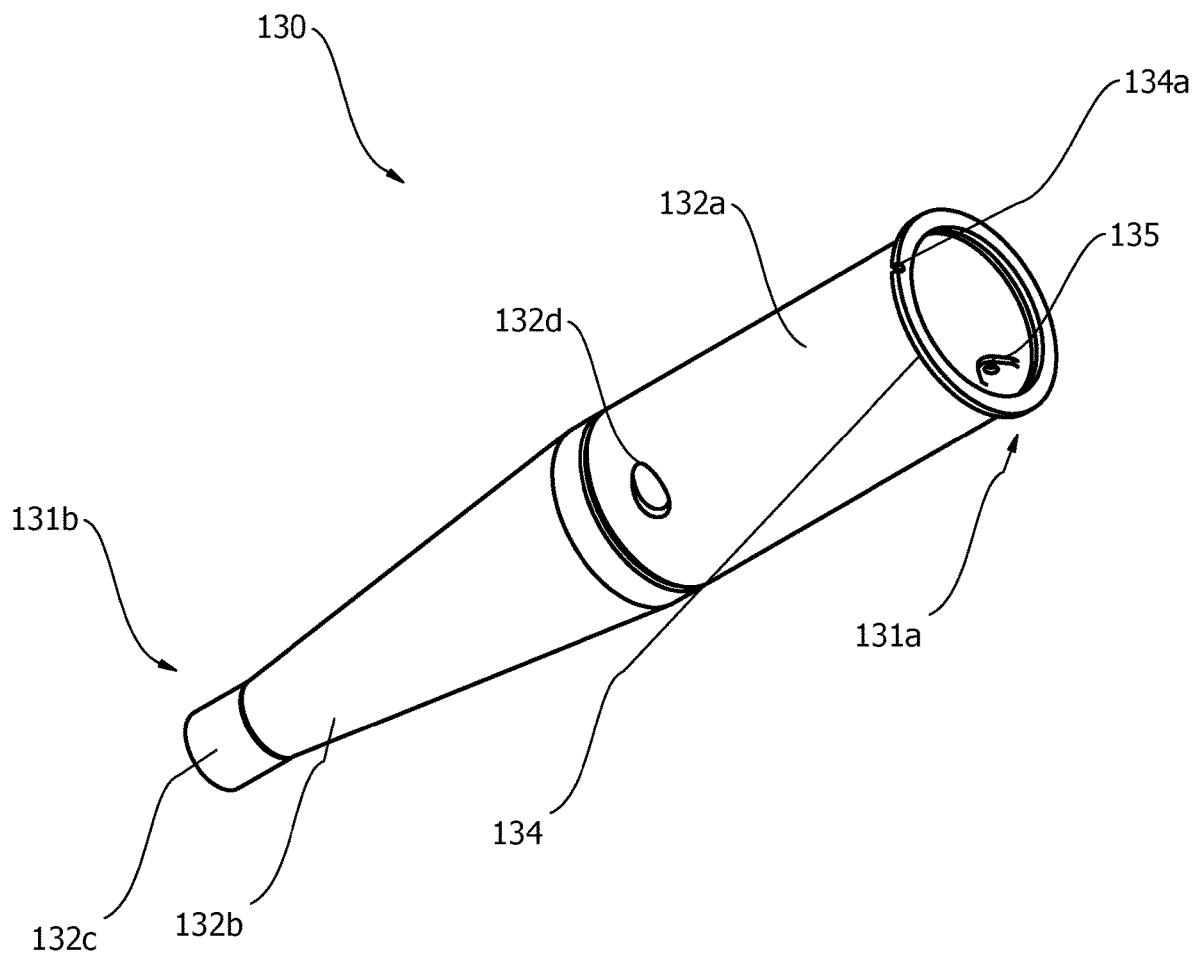
FIG. 11 is a perspective view of a cyclonic insert for use in the sand trap of FIG. 1.
Figure 12:
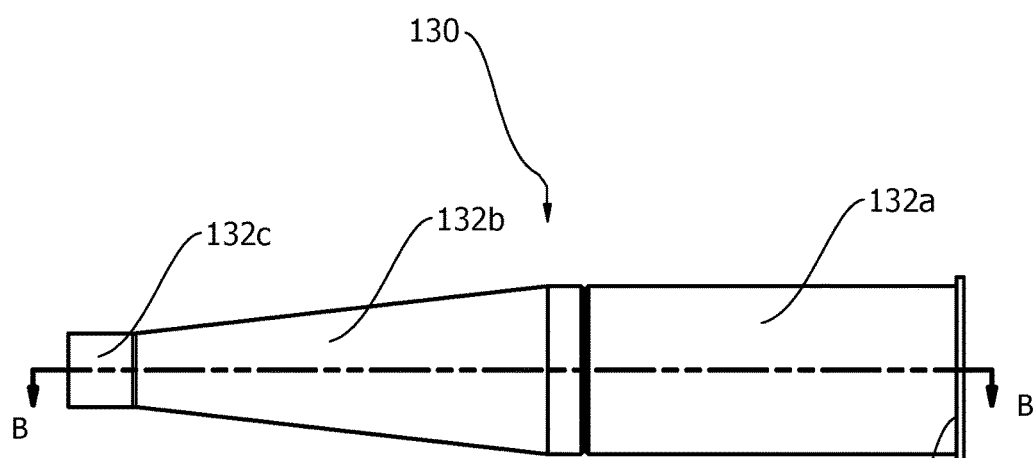
FIG. 12 is a side view of the cyclonic insert of FIG. 11.
Figure 13:
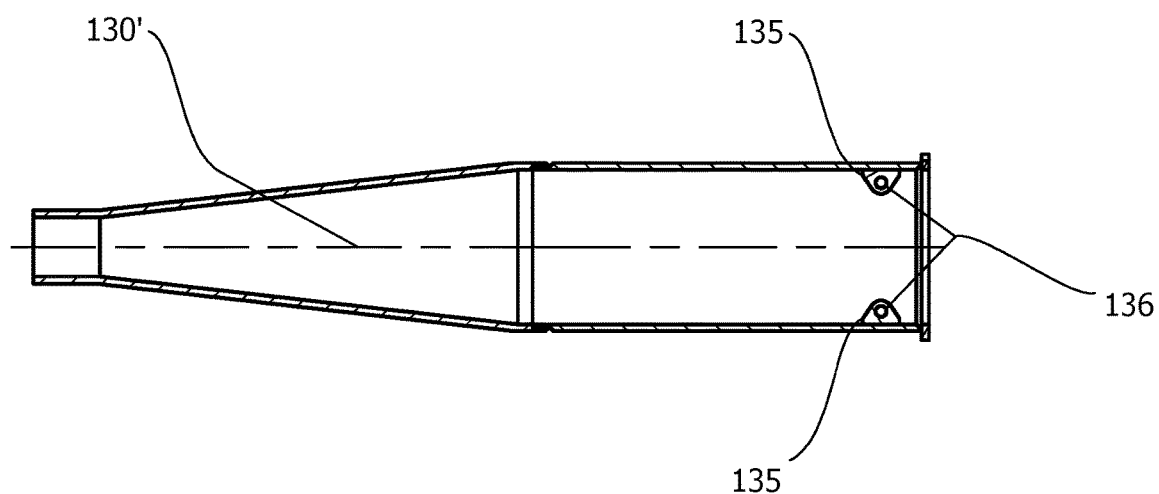
FIG. 13 is a section view taken along line B of FIG. 12.

In some embodiments, the cyclonic insert 130 may be removably positioned in the cylindrical shell 120. For example, the cyclonic insert 130 may have an outwardly-extending flange 134 at a top of the upper portion 132a that rests upon a recessed seat defined by the flange 123. And one or more anchor bracket 135 may extend inside the cyclonic insert 130 for allowing the cyclonic insert 130 to be lifted into and out of the cylindrical shell 120. More particularly, as shown in FIGS. 11 and 13, the anchor bracket 135 may include a hole or hook 136 for receiving a hook or other lifting device. It may be beneficial for at least two anchor brackets 135 to be included. Being removable may be particularly desirable so that a cyclonic insert 130 may be removed and replaced when at the end of its service life, allowing the sand trap 100 to be quickly returned to service. In addition, the cyclonic insert 130 may be exchanged with another cyclonic insert having different geometry as required to achieve sufficient (e.g., 100%) sand removal in view of inlet conditions (e.g., flow rate; pressure; and solids, oil, gas, and water percentages).

To keep the cyclonic insert 130 from undesirably rotating and assure that the inlet 132d aligns with the inlet opening 126, the flange 134 may have a notch 134a complementary to a protrusion or dowel pin in the flange 123. In addition, a gasket below and/or above the flange 134 may help seal and lock the cyclonic insert 130 via friction when the flange 124 is secured to the flange 123.

While the cyclonic insert 130 may be manufactured in various ways, it has been unexpectedly beneficial to flow patterns to machine two parts piloted and welded together (one for the upper portion 132a and another that forms both the funnel portion 132b and the choke area 132c), weld the flange 134 to the upper portion 132a, and then machine again.

Turning now to the accumulator 150, the accumulator 150 is generally spherical and has upper and lower ends 152a, 152b and inner and outer faces 152c, 152d. The upper end 152a has an opening 153 centered along the longitudinal axis 120', and the lower end 152b has an exit opening 154 centered along the longitudinal axis 120'. As shown in FIG. 9, it may be particularly desirable for the cylindrical wall 122 to extend into the accumulator 150. The cylindrical wall 122 may be directly coupled to the upper end 152a of the accumulator 150, and/or may be coupled to the accumulator 150 through the reinforcement pad 170. The exit opening 154 at the accumulator lower end 152b leads to an attachment flange 155 configured for attachment to outlet piping. The accumulator 150 may be positioned on a stand 180 to provide access to the attachment flange 155. While it may be particularly desirable for the accumulator 150 to be generally spherical as shown, other shapes may nevertheless be used in different embodiments so long as the accumulator 150 and the cylindrical shell 120 collectively form a single integrated vessel.

It may be particularly important that the inside of the accumulator 150 is substantially open, such that there is no obstruction between the choke area 132c of the cyclonic insert 130 and the exit opening 154 of the accumulator 150 and sand (or other particulate matter) can pass unimpeded and accumulate in the accumulator 150.

The reinforcement pad 170 has an opening 171 centered along the longitudinal axis 120' and is curved to correspond with the curvature of the accumulator outer face 152d. The reinforcement pad 170 may strengthen the attachment between the accumulator 150 and the cylindrical shell 120, and/or may aid in aligning the accumulator 150 with the cylindrical shell 120 during manufacturing. The reinforcement pad 170 may also be used for aesthetic purposes, and can take various forms.

In use, piping delivers (under high pressure) fluid and particulates from oil and gas extraction operations to the inlet opening 126 (via the attachment flange 128), and the fluid and particulates pass from the inlet opening 126 to inside the cylindrical wall 122 above the vortex finder lower end 125*b*. The positioning of the inlet opening 126 causes the fluid and particulates to rotate inside the cylindrical wall 122 in a cyclonic or helical manner, and gravity causes the particulates to filter through the cyclonic insert 130. A low pressure area at the center of the cyclone allows lighter fluids and gasses to rise up into the vortex finder 125 and exit the cylindrical shell 120. The shape and location of the cyclonic insert 130 may be particularly useful in allowing the particulates to pass through the funnel portion 132*b* and the choke area 132*c* while causing the fluid to exit through the vortex finder 125 (and ultimately through piping coupled to the vortex finder 125). The particulates passed through the cyclonic insert 130 are accumulated in the accumulator 150 and selectively output through the exit opening 154 using a dumping valve. The skid 110 may provide a convenient, robust package for delivering and moving the other components, and may allow easy access to various components of the sand trap 100.

In some embodiments, as shown throughout the drawings, a filter 200 may be placed downstream of the sand trap 100 in a vertical orientation such that the filter 200 is located on the skid 110. In other embodiments incorporating the filter 200, the filter 200 may be on another skid or otherwise mounted externally to the skid 110. The filter 200 may be used to remove small particles passed through the sand trap 100.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. A sand trap for use in oil and gas extraction operations, the sand trap comprising:
a hollow cylindrical wall having upper and lower ends and a longitudinal axis extending generally vertically, the hollow cylindrical wall having an inlet opening for receiving a high pressure fluid stream with particulates, the inlet opening having an axis generally perpendicular but askew to the longitudinal axis of the hollow cylindrical wall;
a cap selectively secured over the hollow cylindrical wall;
a vortex finder extending downwardly from the cap and defining a passageway for fluid to exit, the passageway being coaxial with the longitudinal axis of the hollow cylindrical wall;
a cyclonic insert inside the hollow cylindrical wall; the cyclonic insert having a generally cylindrical upper portion, a choke area, and a funnel portion that narrows from the upper portion to the choke area; the generally cylindrical upper portion having an inlet with an area greater than or equal to an area of the inlet opening and is configured to align with the inlet opening to allow uninterrupted flow into the cyclonic insert;
a spherical accumulator extending downwardly from the hollow cylindrical wall, the spherical accumulator having upper and lower ends and a center axis that is coaxial with the longitudinal axis of the hollow cylindrical wall, the spherical accumulator upper end having an upper opening centered along the longitudinal axis of the hollow cylindrical wall, the spherical accumulator lower end having an exit opening centered along the longitudinal axis of the hollow cylindrical wall, the spherical accumulator being unobstructed from the upper opening to the exit opening such that the particulates are allowed to pass unimpeded and accumulate in the accumulator; and
a support extending between the choke area to and an inner face of the cylindrical wall, wherein the support acts as a cap to the spherical accumulator.

2. The sand trap of claim 1, wherein the lower end of the hollow cylindrical wall passes through the upper opening of the spherical accumulator and into the spherical accumulator.

3. The sand trap of claim 2, wherein:
the cyclonic insert upper portion, funnel portion, and choke area have a generally constant wall thickness;
the spherical accumulator meets the cylindrical wall along a ring formed in a generally horizontal plane; and
the support meets the cylindrical wall along the generally horizontal plane.

4. The sand trap of claim 2, wherein the choke area of the cyclonic insert extends below an upper point on the spherical accumulator.

5. The sand trap of claim 4, wherein a lower end of the vortex finder extends into the funnel portion of the cyclonic insert.

6. The sand trap of claim 5, wherein the lower end of the hollow cylindrical wall extends below the choke area of the cyclonic insert.

7. The sand trap of claim 1, further comprising a reinforcement pad having an opening centered along the longitudinal axis of the hollow cylindrical wall, the hollow cylindrical wall passing through the reinforcement pad opening, the reinforcement pad being curved to correspond with a curvature of the spherical accumulator, the reinforcement pad being fastened to the hollow cylindrical wall and the spherical accumulator.

8. The sand trap of claim 1, wherein the cyclonic insert is removably coupled to the hollow cylindrical wall.

9. The sand trap of claim 8, wherein:
a flange extends from the hollow cylindrical wall upper end;
the cap is selectively secured to the flange;
the flange defines a recess; and
a top of the cyclonic insert upper portion is seated in the recess of the flange.

10. The sand trap of claim 9, wherein the top of the cyclonic insert upper portion has an aligning notch complementary to a protrusion in the flange, the notch being configured to limit rotation of the cyclonic insert about a longitudinal axis.

11. The sand trap of claim 9, wherein the cyclonic insert upper portion has an anchor bracket above the inlet of the cyclonic insert for allowing the cyclonic insert to be lifted into and out of the cylindrical wall.

12. The sand trap of claim 1, further comprising:
a skid having a base, a post, and a joist;
a stand extending upwardly from the skid base and supporting the spherical accumulator; and
bracing coupling the hollow cylindrical wall to at least one item selected from the group consisting of the post and the joist;
wherein a generally horizontal plane extends along the inlet opening axis, wherein the bracing extends along the generally horizontal plane; and wherein the skid is movable between a generally horizontal position for transport and a generally erect position for use.

13. The sand trap of claim 1, further comprising a downstream vertical filter.

14. The sand trap of claim 13, wherein the downstream vertical filter is offset laterally from the spherical accumulator.

15. The sand trap of claim 1, wherein an outer diameter of the spherical accumulator is smaller than a length between the upper and lower ends of the cylindrical wall.

16. The sand trap of claim 15, wherein an inner diameter of the choke area is larger than an inner diameter of the vortex finder.

17. The sand trap of claim 1, wherein a length of the vortex finder is greater than a length of the cylindrical upper portion of the cyclonic insert.

18. The sand trap of claim 1, wherein the funnel portion and choke area of the cyclonic insert are collectively longer than the cylindrical upper portion of the cyclonic insert.

19. A sand trap for use in oil and gas extraction operations, the sand trap comprising:

a cyclonic flow section having a longitudinal axis, an inlet opening for receiving a high pressure fluid stream with particulates, a generally cylindrical upper portion, a choke area, and a funnel portion that narrows from the upper portion to the choke area; the inlet opening having an axis generally perpendicular but askew to the longitudinal axis;

a cap over the cyclonic flow section;

a vortex finder extending downwardly from the cap and defining a passageway for fluid to exit, the passageway being coaxial with the longitudinal axis;

a spherical accumulator extending downwardly from the cyclonic flow section, the spherical accumulator having upper and lower ends and a center axis that is coaxial with the longitudinal axis, the spherical accumulator upper end having an upper opening centered along the longitudinal axis, the spherical accumulator lower end having an exit opening centered along the longitudinal axis, the spherical accumulator being unobstructed from the upper opening to the exit opening such that the particulates are allowed to pass unimpeded and accumulate in the accumulator; and an annular support extending radially outward from the choke area, wherein the support acts as a cap to the spherical accumulator.

* * * * *